United States Patent
Linder et al.

(10) Patent No.: US 6,877,319 B2
(45) Date of Patent: Apr. 12, 2005

(54) METHOD OF OPERATING A COMBUSTION PLANT AND A COMBUSTION PLANT

(75) Inventors: Ulf Linder, Leicester (GB); Erik Hans Eriksen, Stathelle (NO); Knut Ingvar Åsen, Porsgrunn (NO)

(73) Assignees: Alstom Technology LTD, Baden (CH); Norsk Hydro ASA, Oslo (NO)

( * ) Notice: Subject to any disclaimer, the term of this patent is extended or adjusted under 35 U.S.C. 154(b) by 64 days.

(21) Appl. No.: 10/296,876
(22) PCT Filed: May 30, 2001
(86) PCT No.: PCT/SE01/01206
§ 371 (c)(1), (2), (4) Date: Jul. 30, 2003
(87) PCT Pub. No.: WO01/92703
PCT Pub. Date: Dec. 6, 2001

(65) Prior Publication Data
US 2004/0011048 A1 Jan. 22, 2004

(30) Foreign Application Priority Data
May 31, 2000 (SE) .............................................. 0002037

(51) Int. Cl.[7] .................................................. F02C 6/18
(52) U.S. Cl. ........................ 60/772; 60/780; 60/39.181
(58) Field of Search ..................... 60/772, 780, 39.181, 60/39.12

(56) References Cited
U.S. PATENT DOCUMENTS

| 5,035,727 A | 7/1991 | Chen |
| 5,118,395 A | 6/1992 | Chen et al. |
| 5,865,878 A | 2/1999 | Drnevich et al. |
| 5,901,547 A | * 5/1999 | Smith et al. .................. 60/773 |
| 6,148,602 A | * 11/2000 | Demetri ....................... 60/775 |

FOREIGN PATENT DOCUMENTS

| EP | 0 658 367 A2 | 6/1995 |
| WO | WO 98/55208 | 12/1998 |
| WO | WO 98/55394 | 12/1998 |

* cited by examiner

Primary Examiner—Ehud Gartenberg
(74) Attorney, Agent, or Firm—Burns, Doane, Swecker & Mathis, L.L.P.

(57) ABSTRACT

The invention concerns a method of operating a combustion plant comprising at least a first gas turbine (26), a second turbine (34, 50) and a membrane reactor device (16) which comprises a membrane filter device (18) for separating oxygen from a gas mixture and a combustion space (19). A gas mixture containing oxygen is supplied to the membrane reactor device (16). At least some oxygen is separated from the gas mixture with the help of the membrane filter device (18). The separated oxygen is used at the combustion in the combustion space (19). The oxygen-depleted gas that is obtained after the separation of oxygen and which has not gone through a combustion process is used to run the first gas turbine (26). Combustion gases run the second turbine (34, 50). The invention also concerns a combustion plant for carrying out the method.

15 Claims, 2 Drawing Sheets

METHOD OF OPERATING A COMBUSTION PLANT AND A COMBUSTION PLANT

FIELD OF THE INVENTION

The present invention concerns a method of operating a plant comprising at least a first gas turbine, a second turbine and a membrane reactor device which comprises a membrane filter device for separating oxygen from a gas mixture and a combustion space for the combustion of a fuel. The invention also concerns a combustion plant.

There are different requirements and desires of reducing unwanted emissions from combustion plants. It is thus, inter alia, desirable to reduce the emission of nitrogen oxides as much as possible. There is also a desire to reduce the emission of carbon dioxide which is produced at the combustion. It is possible to recover carbon dioxide from a combustion gas, but since the concentration of carbon dioxide usually is low and since the gas contains other substances, such as oxygen and nitrogen, it is relatively complicated, to recover the carbon dioxide.

A possibility to simplify the manner of recovering carbon dioxide is that the combustion takes place in another medium than air, from which medium carbon dioxide is easier to recover. If air is not used as the combustion medium, then oxygen has to be added to the combustion. It is however relatively expensive to produce oxygen to a sufficient amount. One possibility of producing oxygen is to use a suitable membrane filter device which is arranged to separate oxygen from a gas mixture, which gas mixture usually consists of air. Such membrane filter devices are often called "solid electrolyte membrane (SEM)".

Such membrane filter devices are described in for example US-A-S 118 395. This document describes two kinds of such SEM. The first kind of SEM comprises a membrane that is arranged between two electrodes to which a voltage source may be connected for applying a voltage across the membrane. The second kind, of SEM is called "mixed conducting membrane (MCM)". This kind of membrane filter device comprises a MCM-material and functions without the application of an external voltage. Such a membrane filter functions in that the partial pressure of oxygen is lower on that side of the filter to which oxygen is transferred. Oxygen ions are here conducted in a first direction through the membrane and electrodes are conducted back through the membrane in the opposite direction. The document describes the use of such membrane filter devices on the exhaust side of a gas turbine for recovering oxygen from the exhaust from the turbine. In this context a third kind of membrane ought to be mentioned, i.e. a membrane of a fuel cell material. Such a membrane conducts oxygen ions in a first direction while electrodes are conducted back via an external conductive circuit.

Also the document EP-A-658 367 describes different kinds of SEM. This document describes different combustion plants with a membrane filter device from which oxygen gas is extracted. The oxygen-depleted gas which is obtained from the membrane filter device is conducted to one or more combustion devices and combustion gases from the combustion devices are used to run a gas turbine.

The Norwegian patent application NO-A-972631, which has been made public describes the use of MCM in combustion processes. According to the described processes, compressed air is conducted to a MSM-reactor. The MSM-reactor comprises a membrane filter device which separates oxygen from the air. The heated air from which oxygen has been separated is conducted away via a heat exchanger. The separated oxygen is used at the combustion and combustion gases are conducted to a gas turbine for running the same. The combustion gases mainly consist of water steam and carbon dioxide. The water steam may be condensed, which makes it possible for carbon dioxide to be separated and to be taken care of. Since nitrogen essentially does not take part in the combustion process, the emission of undesired nitrogen oxides is avoided.

The Norwegian patent application NO-A-972632, which has been made public, describes similar processes where MSM is used. This application discloses that compressed air goes through a combustion and is conducted on to a MCM-reactor. The combusted air which has passed through the MCM-reactor is conducted away via a gas turbine. Since this air has gone through a combustion, it comprises carbon dioxide and certain nitrogen oxides. The oxygen which has been separated from the air mixture in the MCM-reactor is used in a combustion process for thereafter running a gas turbine.

SUMMARY OF THE INVENTION

The purpose of the present invention is to achieve an improved method of operating a combustion plant of the kind which comprises at least a first gas turbine, a second turbine and a membrane reactor device which comprises a membrane filter device for separating oxygen from a gas mixture and a combustion space for the combustion of a fuel. A purpose is thereby to achieve a method with a high efficiency at the same time as it is possible to avoid undesired emissions of combustion products. Another purpose is to achieve such a method by relatively simple means. Still another purpose of the invention is to achieve a combustion plant for carrying out the method according to the invention. Further advantages of the invention will be clear from the description below.

The purpose of the invention is achieved by the initially mentioned method, which method comprises:

that a gas mixture containing oxygen is supplied to the membrane reactor device and there goes through a separation in the membrane filter device, such that at least some oxygen is separated from the gas mixture such that an oxygen-depleted gas is obtained, that at least a part of said oxygen which has been separated from the gas mixture is used at said combustion in the combustion space, that said gas mixture is heated with the help of heat generated through said combustion in the combustion space, that at least a part of said heated oxygen-depleted gas, which has not gone through a combustion process, is used to run said first gas turbine, and that at least a part of the combustion gases which emanate from said combustion is used to run said second turbine.

Said heated oxygen-depleted gas mixture which is supplied to the first gas turbine has thus been heated without taking part in the actual combustion process. Since this heated oxygen-depleted gas is used to run a gas turbine, the energy in this heated gas is used in an efficient manner and since the gas that runs the first gas turbine has not gone through a combustion, this gas comprises no essential amount of undesired nitrogen oxides or carbon dioxide. The energy in the heated oxygen-depleted gas is thus used in an efficient manner without causing undesired emissions. At the same time of course the energy in said combustion gases is used, since these gases are conducted to another turbine for running the same. With the method according to the invention a high efficiency may thus be obtained at the same time as undesired emissions are avoided.

Unlike the method in the above mentioned NO-972631, the heated oxygen-depleted gas mixture is used to run a gas turbine, which has been shown to lead to a high efficiency of the method according to the present invention. Unlike the method according to the above mentioned NO-972632, according to the present invention gas that has not gone through a combustion is used to run the first gas turbine. This means that undesired emissions of nitrogen oxides and carbon dioxide are avoided.

In this context the following may be noted. The membrane reactor device may constitute one unit where the membrane filter device and the combustion space both are arranged within one and the same casing. It is however also possible that the membrane filter device is arranged separately and at a distance from the combustion space. The membrane reactor device comprises in this case thus two separate units which however are connected to each other in such a manner that heat from the combustion in the combustion space can be used for heating the gas mixture which is conducted to the membrane filter device. It should also be noted that by "oxygen-depleted gas" is in this context meant only that this gas contains less oxygen than the gas mixture before oxygen has been separated from the gas mixture. The oxygen-depleted gas may thus still contain a smaller or larger amount of oxygen.

According to an advantageous manner of carrying out the method, said gas mixture which is supplied to the membrane reactor device consists of air. The method is made very simple in that air is used for said gas mixture. This means that also a conventional gas turbine that is optimised for being run by air may be used as said first gas turbine.

According to a further advantageous manner of carrying out the method, the gas which leaves said first gas turbine is used for heating in a heat exchanger. The heat that exists in the gas which leaves the first gas turbine is thereby used.

According to another advantageous manner of carrying out the method, said heat exchanger is used to evaporate a medium that runs a steam turbine. Thereby, the energy that exists in the gas which is conducted to the heat exchanger can be used in an efficient manner.

According to a further advantageous manner of carrying out the method, also the gas which leaves the second turbine is used for heating in said heat exchanger. Thereby an efficient use of the heat that exists in the gas from the second turbine is achieved.

According to a further advantageous manner of carrying out the method, said gas which leaves the second turbine comprises at least the substances $CO_2$ and $H_2O$, wherein, after passing through said heat exchanger, at least some $H_2O$ is conducted back to the membrane reactor device. Water may thus be conducted back to the membrane reactor device, for example in order to contribute to the avoidance of coke formation on the membrane surfaces.

According to a further advantageous manner of carrying out the method, said gas which leaves the second turbine comprises at least the substances $CO_2$ and $H_2O$, wherein, after passing through said heat exchanger, $CO_2$ is completely or partly taken care of for use or storage. The emission of carbon dioxide to the environment is thereby avoided.

According to another advantageous manner of carrying out the method, said second turbine constitutes said steam turbine, wherein the steam turbine is fed with a turbine medium which is conducted in a conduit member and heated in said heat exchanger, and wherein at least a part of said combustion gases from the combustion in the membrane reactor device is conducted to said conduit member for being supplied to said steam turbine. According to this manner there is thus no need for a second gas turbine. The energy in the combustion gases is still used in that they are used to run said steam turbine. This manner leads to a reduction of the costs. It is of course possible that combustion gases are conducted both to a gas turbine and to a steam turbine.

According to a further advantageous manner of carrying out the method, said combustion gases which are conducted to said conduit member comprises at least the substances $CO_2$ and $H_2O$, wherein, after passing through said steam turbine, at least some $CO_2$ is drained off from the conduit member for use or storage. Since carbon dioxide is supplied to the steam turbine, this carbon dioxide must be taken care of. Through this manner, it is avoided that the carbon dioxide is discharged into the environment.

According to a further advantageous manner of carrying out the method, after passing through said steam turbine, at least some $H_2O$ is drained off from the conduit member and brought back to said membrane reactor device. The combustion gases which are supplied to the steam turbine cycle normally comprise a certain amount of water steam. In order to avoid that the amount of water increases in the steam turbine cycle, some water is therefore suitably drained off. A least a part of this water may be conducted back to the membrane reactor device for optimising the conditions in the same.

According to a further advantageous manner of carrying out the method, said gas mixture is compressed with the help of a compressor before it is supplied to the membrane reactor device. A suitable pressure is thereby obtained in the gas mixture.

According to still another advantageous manner of carrying out the method, said compressor is run by said first and/or second turbine. This constitutes an efficient manner of running the compressor. The different turbines may have a coin-mon axis of rotation, but this is not necessary. According to a particularly advantageous manner of carrying out the method, said compressor and said first gas turbine together constitute a conventional gas turbine arrangement with a compressor part and a turbine part.

According to a further advantageous manner of carrying out the method, electric energy is derived from the membrane reactor device. This constitutes an optimal use of the energy that is produced in the membrane reactor device.

According to a further advantageous manner of carrying out the method, the membrane filter device comprises both MCM-material and a fuel cell material, wherein said fuel cell material is used for deriving said electric energy.

As has been mentioned above, a purpose of the invention is to achieve a combustion plant. This combustion plant comprises: a first gas turbine, a second turbine, a membrane reactor device which comprises a membrane filter device for separating oxygen from a gas mixture and a combustion space for the combustion of a fuel, first conduit means arranged to conduct a gas mixture containing oxygen to said membrane reactor device, wherein the membrane reactor device is arranged such that said gas mixture goes through a separation in the membrane filter device, such that at least some oxygen is separated from the gas mixture such that an oxygen-depleted gas is obtained and such that at least a part of said oxygen which has been separated from the gas mixture is used at said combustion in the combustion space, wherein the membrane reactor device is arranged such that said gas mixture is heated with the help of heat generated through said combustion in the combustion space, a second conduit means arranged for conducting at least a part of said heated oxygen-depleted gas, which has not gone through a combustion process, to said first gas turbine for running the same, and third conduit means arranged for conducting at least a part of the combustion gases which emanate from said combustion to said second turbine for running the same.

With such a combustion plant corresponding advantages are achieved as those which have been described above in connection with the method. The device may also comprise further components which will be described below in connection with the description of embodiments of the invention.

BRIEF DESCRIPTION OF THE DRAWINGS

The present invention will now be explained with the help of examples of manners of carrying out the method and embodiments of the device and with reference to the annexed drawings.

DETAILED DESCRIPTION OF THE INVENTION

The invention will now first be described with reference to FIG. 1 and FIG. 2. These figures show embodiments of the combustion plant according to the invention. The method according to the invention will be clear from the description of the function of the plants according to these figures.

Figure 1:
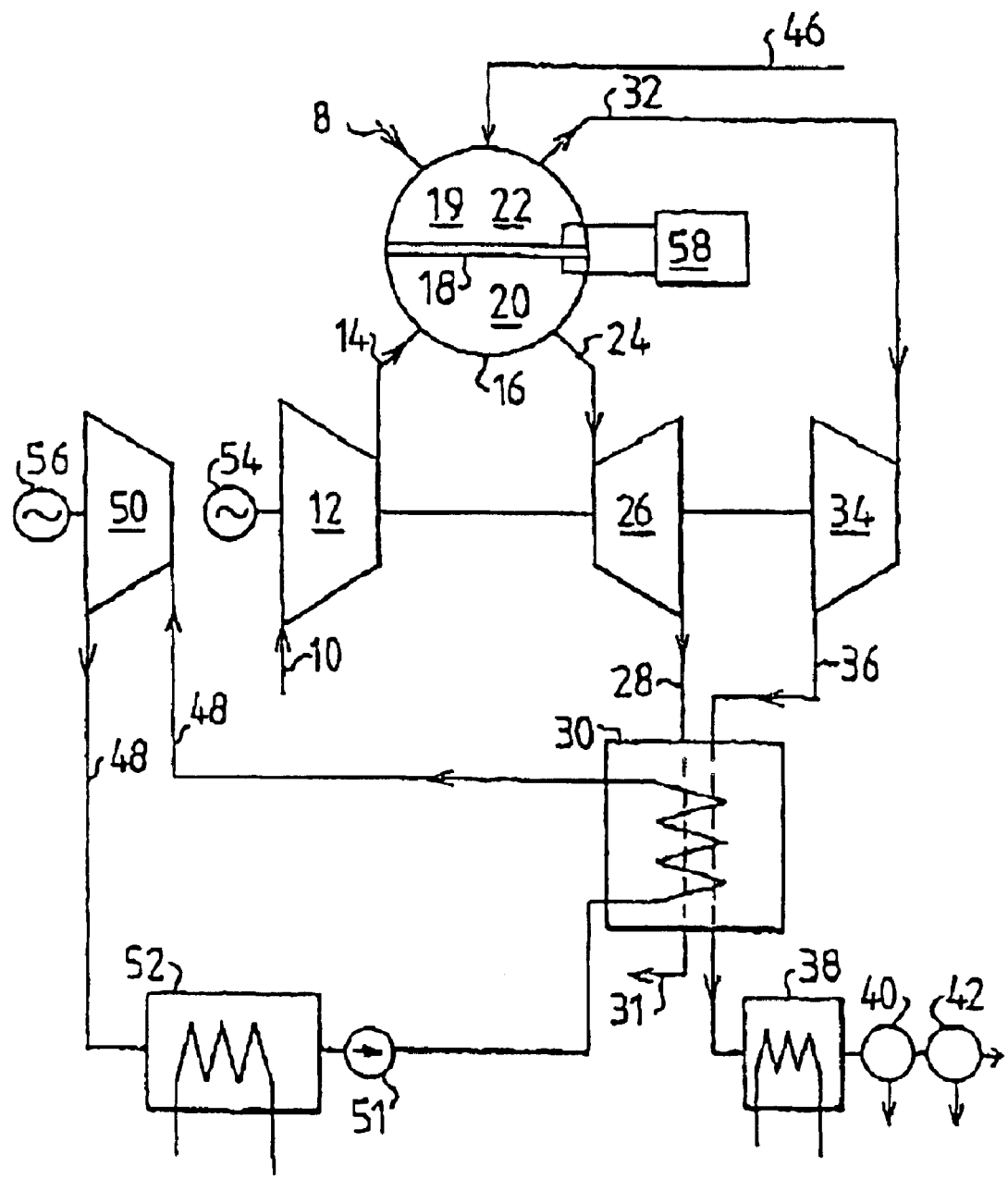
FIG. 1 shows schematically an example of a combustion plant according to the invention.

FIG. 1 shows that a gas mixture, preferably air, is conducted via an inlet 10 to a compressor 12. The compressed gas mixture is further conducted via a first conduit means 14 to a membrane reactor device 16. The membrane reactor device 16 comprises a membrane filter device 18 for separating oxygen from a gas mixture and a combustion space 19 for the combustion of a fuel. This fuel is supplied via a fuel inlet 8. The fuel may for example consist of natural gas or other fossil fuel. As has been pointed out above, it is not necessary that the membrane filter device 18 and the combustion space 19 are arranged within one and the same casing. However, according to a preferred embodiment, the membrane reactor device 16 constitutes one unit which comprises said membrane filter device 18 and the combustion space 19. The gas mixture which is supplied to the membrane reactor device 16 is heated with the help of heat which is formed through the combustion in the combustion space 19. The heating is done to a working temperature which is suitable for the membrane filter device 18. This temperature may for example be between 800° C. and 200° C.

The gas mixture which comprises oxygen goes through a separation in the membrane filter device 18. At least some oxygen is thus separated from the gas mixture and is transferred from a first space 20 to a second space 22. The oxygen depleted gas which remains in the first space 20 is conducted via a second conduit means 24 to a first gas turbine 26 for running the same. At least a part of the oxygen which has been separated from the gas mixture and which has been transferred to the second space 22 is used at the combustion in the combustion space 19. At least a part of the combustion gases which emanate from the combustion is conducted via a third conduit means 32 to a second turbine 34 for running the same. The second turbine 34 may suitably be a turbine that is adapted to be run by said combustion gases. Gas from the first gas turbine 26 is conducted via a fourth conduit means 28 to a heat exchanger 30 and further front the heat exchanger 30 to an outlet 31. Since this gas preferably only consists of air that has not gone through a combustion, this gas may be emitted into the environment without causing any harm. The gas from the second turbine 34 is conducted via a fifth conduit means 36 to said heat exchanger 30. The remaining heat in the gases from the two turbines 26, 34 is thus used for heating in the heat exchanger 30.

The heat exchanger 30 is preferably used for heating a medium, for example water, which flows through a conduit member 48 for running a steam turbine 50. The steam turbine may for example be used for running a generator 56 for producing electric energy. The conduit member 48 in the steam turbine cycle suitably passes through a heat exchanger 52 with the help of which further useful energy may be extracted from the medium that flows in the conduit member 48. Furthermore, this heat exchanger 52 can condense the medium which flows in the conduit member 48. The steam turbine cycle may also comprise a pump 51 for pumping the medium in the conduit member 48.

In the shown embodiment, the compressor 12 is run by the first 26 and the second 34 turbines, which have a common axis of rotation. The first 26 and second 34 turbines may also be used to run a generator 54 for producing electric energy. The second turbine 34 does of course do not have to be arranged on the same axis of rotation as the first turbine 26. The second turbine 34 may in this case be arranged to run a separate generator for producing electric energy. However, according to an advantageous embodiment, the compressor 12 and the first gas turbine 26 have a common axis of rotation. The first gas turbine 26 and the compressor 12 may thus together constitute a conventional gas turbine arrangement which is adapted to be run by air.

The gases from the second turbine 34 which have been conducted via the fifth conduit means 36 through the heat exchanger 30 are conducted further via a heat exchanger 38. The combustion gas which emanates from combustion in the membrane reactor device 16 and which has been conducted via the second turbine 34 and the fifth conduit means 36 comprises mainly carbon dioxide and water steam. In the heat exchanger 38, this gas is preferably cooled such that water is condensed. The water may possibly by drained off via a discharge member 40. After the condensation of the water, the remaining gas mainly comprises carbon dioxide. This fact makes it possible for carbon dioxide to be drained off via the discharge member 42. Carbon dioxide may thereby be taken care of for use or storage and does therefore not need to be discharged into the environment. According to a preferred manner of carrying out the method according to the invention, essentially all carbon dioxide is drained off via the discharge member 42. Some water may possibly via a sixth conduit means 46 be conducted back to the membrane reactor device 16. The water may be used for avoiding coke-formation on the membrane surfaces. According to another alternative embodiment, also a certain amount of carbon dioxide may be conducted back to the membrane reactor device 16 via the sixth conduit means 46 for acting as a sweep gas in the membrane filter device 18. In case mainly only water is conducted back to the membrane reactor device 16, a sweep gas for the membrane filter device 18 may possibly be produced internally in the membrane reactor device 16.

The combustion plant may also comprise a device 58 for deriving electric energy from the membrane reactor device 16. The membrane filter device 18 which forms part of the membrane reactor device 16 may be of the kind where a difference in electric potential occurs between different positions in the membrane filter device 18. This difference in electric potential may be used for extracting electric energy. The potential difference may for example be achieved in that the membrane filter device, in addition to a MCM-material, also comprises a fuel cell material.

Figure 2:
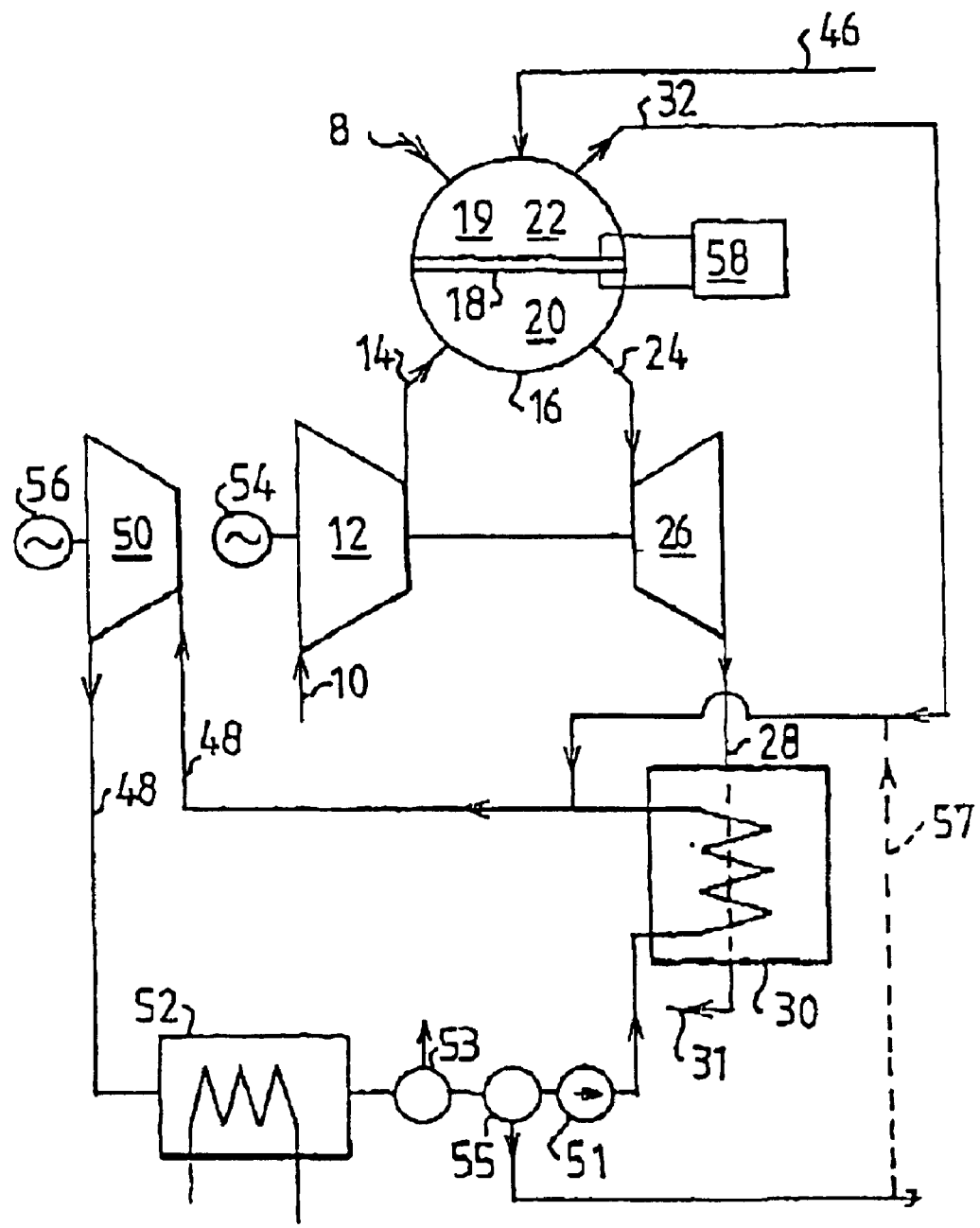
FIG. 2 shows also schematically an alternative embodiment of a combustion plant according to the invention.

FIG. 2 illustrates an alternative embodiment to the above-described method and combustion plant. Corresponding parts as in FIG. 1 have the same reference numbers in FIG. 2. For these parts, it is referred to the description above in connection with FIG. 1. The embodiment according to FIG. 2 differs from the embodiment according to FIG. 1 primarily in that combustion gases from the membrane reactor device 16 are not conducted to a separate turbine but are conducted via the third conduit means 32 to the above mentioned conduit member 48 which forms part of the steam turbine circle. The combustion gases from the membrane reactor device 16 thus contribute to the operation of the steam turbine 50. The combustion gases that via the third conduit means 32 are conducted to the conduit member 48 mainly comprise carbon dioxide and water steam. After passing through the steam turbine 50, suitably water steam is condensed to water with the help of a heat exchanger 52. Carbon dioxide may then be drained off via discharge member 53 for use or for storage. Via the discharge member 55, water may be drained off from the conduit member 48. This water may in a similar manner as in connection with FIG. 1 possibly be conducted back to the membrane reactor device 16. Possibly, some water may be conducted to the third conduit means 32 via a seventh conduit means 57.

It should be noted that the figures only illustrate the plant schematically. The plant may thus comprise other parts than those shown in the figures. For example, further heat exchangers may be used for controlling the temperature and for extracting heat.

The method and the plant according to the present invention have several advantages. The combustion thus takes place essentially or completely in the absence of nitrogen. This means that no undesired nitrogen oxides are formed or discharged from the plant. Since the combustion gases mainly comprise carbon dioxide and water, and since the water may be condensed, the remaining carbon dioxide may be separated from the water and taken care of. Since the membrane reactor device 16 runs both a first 26 and a second 34, 50 turbine, the energy from the membrane reactor device 16 is used in an efficient manner. The membrane reactor device 16 may comprise catalytic as well as non-catalytic combustion. Furthermore, electric energy may be produced directly from the membrane reactor device 16. It should be noted that the electric energy which is hereby produced normally has the form of a direct current. The device 58 for extracting electric energy may therefore possibly comprise a converter which converts the direct current to an alternating current. An environmentally friendly method and a combustion plant with a high efficiency are thus obtained with the invention.

The invention is not limited to the described embodiments but may be varied and modified within the scope of the following claims.

What is claimed is:

1. A method of operating a combustion plant comprising at least a first gas turbine, a second turbine and a membrane reactor device which comprises a membrane filter device for separating oxygen from a gas mixture and a combustion space for the combustion of a fuel, which method comprises:

that a gas mixture containing oxygen is supplied to the membrane reactor device and there goes through a separation in the membrane filter device, such that at least some oxygen is separated from the gas mixture such that an oxygen-depleted gas is obtained, that at least a part of said oxygen which has been separated from the gas mixture is used at said combustion in the combustion space, that said gas mixture is heated with the help of heat generated through said combustion in the combustion space, that at least a part of said heated oxygen-depleted gas, which has not gone through a combustion process, is used to run said first gas turbine, and that at least a part of the combustion gases which emanate from said combustion is used to run said second turbine.

2. A method according to claim 1, wherein said gas mixture which is supplied to the membrane reactor device consists of air.

3. A method according to claim 1, wherein the gas which leaves said first gas turbine is used for heating in a heat exchanger.

4. A method according to claim 3, wherein said heat exchanger is used to evaporate a medium that runs a steam turbine.

5. A method according to claim 3, wherein also the gas which leaves the second turbine is used for heating in said heat exchanger.

6. A method according to claim 5, wherein said gas which leaves the second turbine comprises at least the substances $CO_2$ and $H_2O$ and wherein, after passing through said heat exchanger, at least some $H_2O$ is conducted back to the membrane reactor device.

7. A method according to claim 5, wherein said gas which leaves the second turbine comprises at least the substances $CO_2$ and $H_2O$, wherein, after passing through said heat exchanger, $CO_2$ is completely or partly taken care of for use or storage.

8. A method according to claim 4, wherein said second turbine constitutes said steam turbine, wherein the steam turbine is fed with a turbine medium which is conducted in a conduit member and heated in said heat exchanger, and wherein at least a part of said combustion gases from the combustion in the membrane reactor device is conducted to said conduit member for being supplied to said steam turbine.

9. A method according to claim 8, wherein said combustion gases which are conducted to said conduit member comprises at least the substances $CO_2$ and $H_2O$, wherein, after passing through said steam turbine, at least some $CO_2$ is drained off from the conduit member for use or storage.

10. A method according to claim 8, wherein after passing through said steam turbine, at least some $H_2O$ is drained off from the conduit member and brought back to said membrane reactor device.

11. A method according to claim 1, wherein said gas mixture is compressed with the help of a compressor before it is supplied to the membrane reactor device.

12. A method according to claim 11, wherein said compressor is run by said first and/or second turbine.

13. A method according to claim 1, wherein electric energy is derived from the membrane reactor device.

14. A method according to claim 13, wherein the membrane filter device comprises both MCM-material and a fuel cell material and wherein said fuel cell material is used for deriving said electric energy.

15. A combustion plant comprising: a first gas turbine, a second turbine, a membrane reactor device which comprises a membrane filter device for separating oxygen from a gas mixture and a combustion space for the combustion of a fuel, first conduit means arranged to conduct a gas mixture containing oxygen to said membrane reactor device, wherein the membrane reactor device is arranged such that said gas mixture goes through a separation in the membrane filter device, such that at least some oxygen is separated from the gas mixture such that an oxygen-depleted gas is obtained and such that at least a part of said oxygen which has been separated from the gas mixture is used at said combustion in the combustion space, wherein the membrane reactor device is arranged such that said gas mixture is heated with the help of heat generated through said combustion in the combustion space, a second conduit means arranged for conducting at least a part of said heated oxygen-depleted gas, which has not gone through a combustion process, to said first gas turbine for running the same, and third conduit means arranged for conducting at least a part of the combustion gases which emanate from said combustion to said second turbine for running the same.

* * * * *